Jan. 10, 1933.  A. B. WELTY  1,894,138
HARVESTER THRESHER
Filed June 22, 1931  5 Sheets-Sheet 1
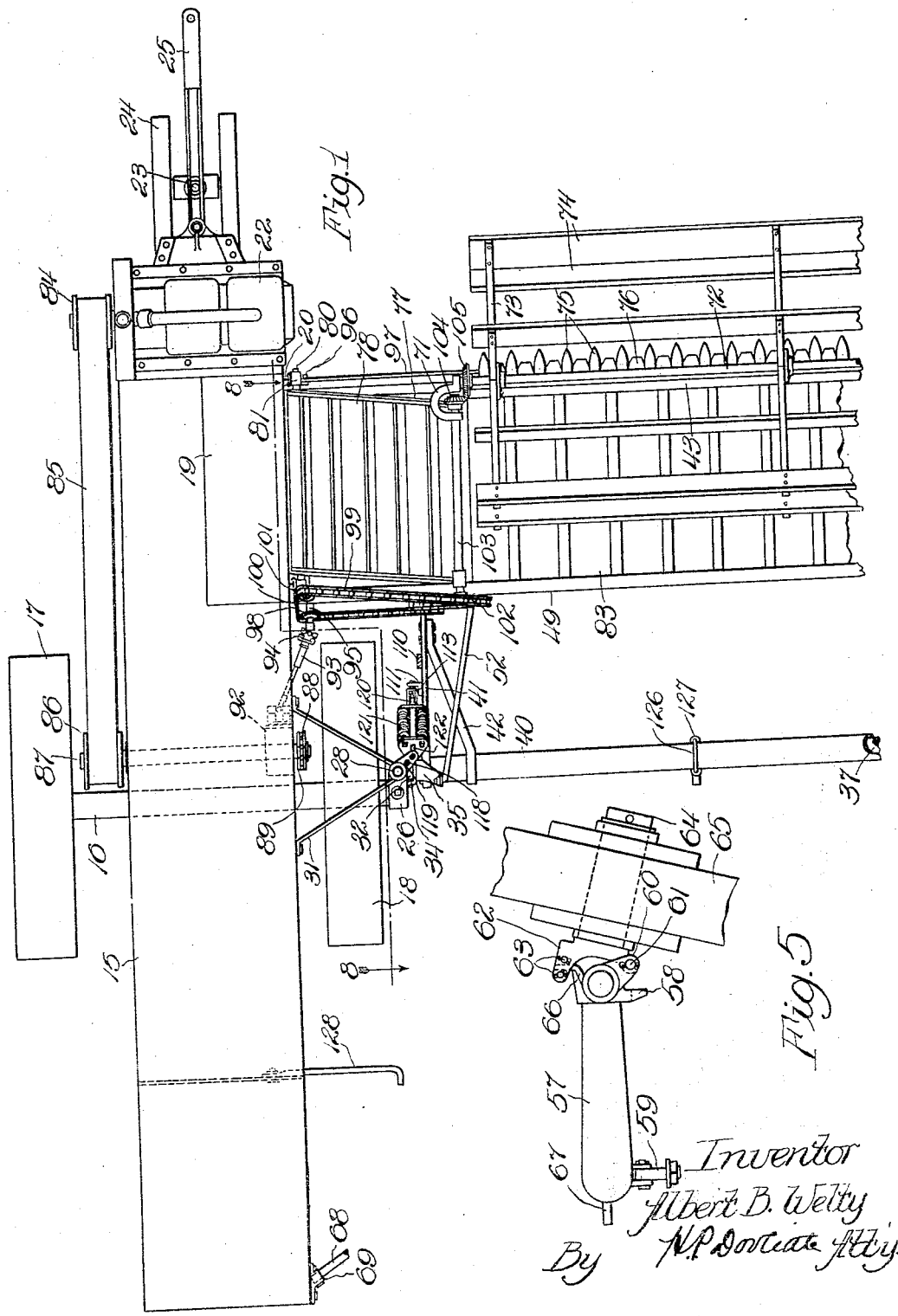

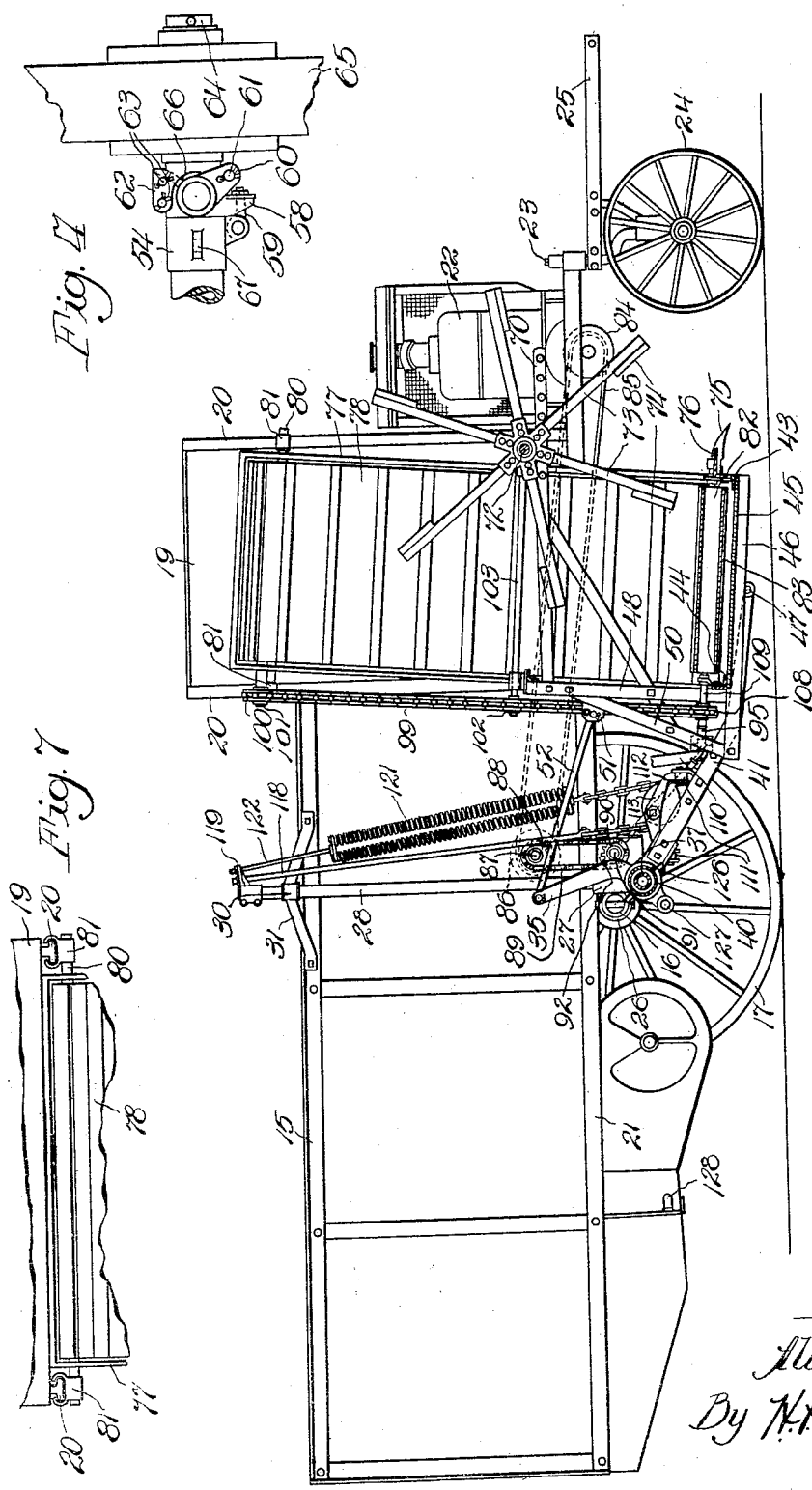

Jan. 10, 1933. A. B. WELTY 1,894,138
HARVESTER THRESHER
Filed June 22, 1931  5 Sheets-Sheet 3
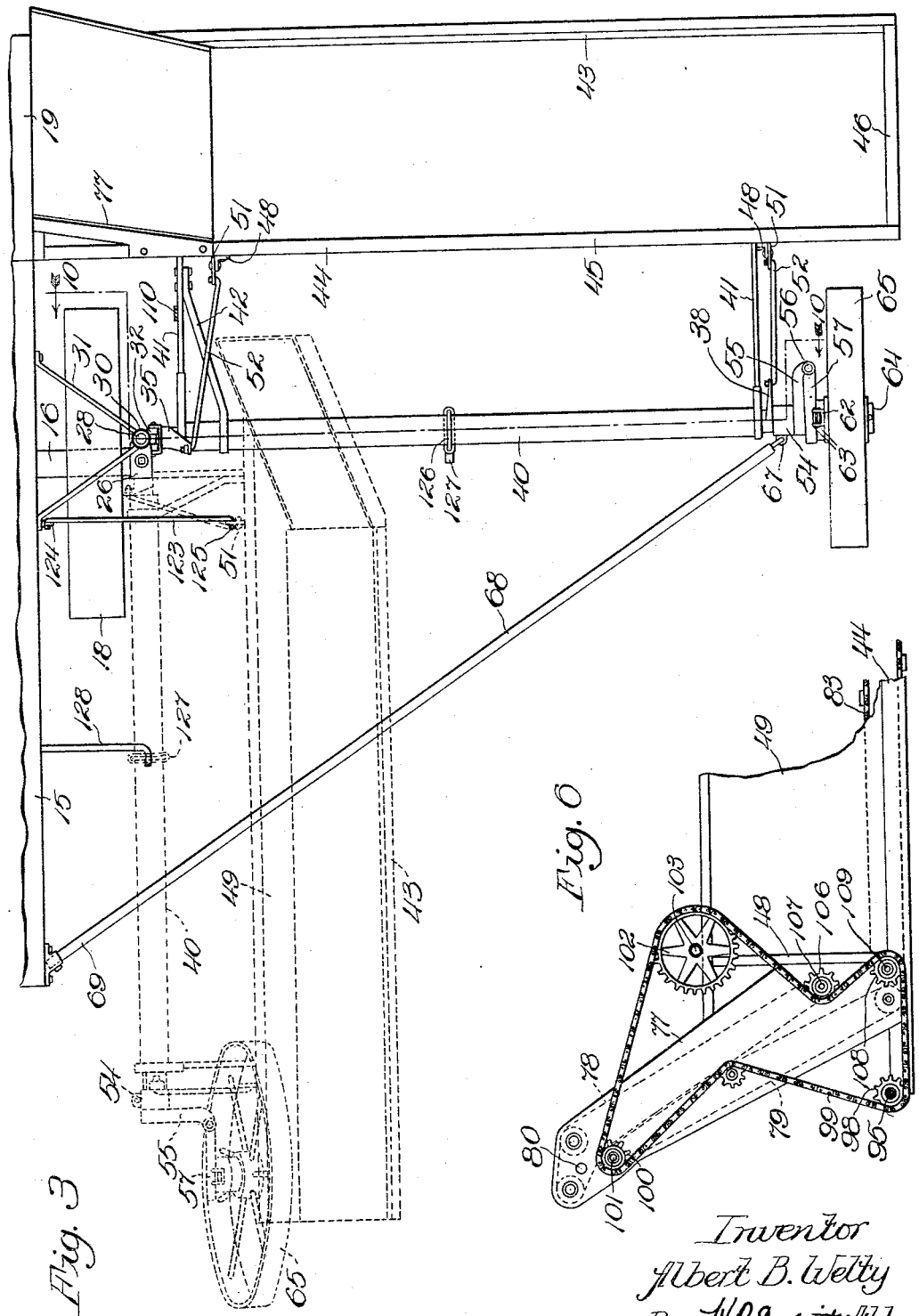
Inventor
Albert B. Welty
By W.P.Dodd Atty.

Jan. 10, 1933. A. B. WELTY 1,894,138

HARVESTER THRESHER

Filed June 22, 1931 5 Sheets-Sheet 4

Inventor
Albert B. Welty
By W. P. Doolittle Atty.

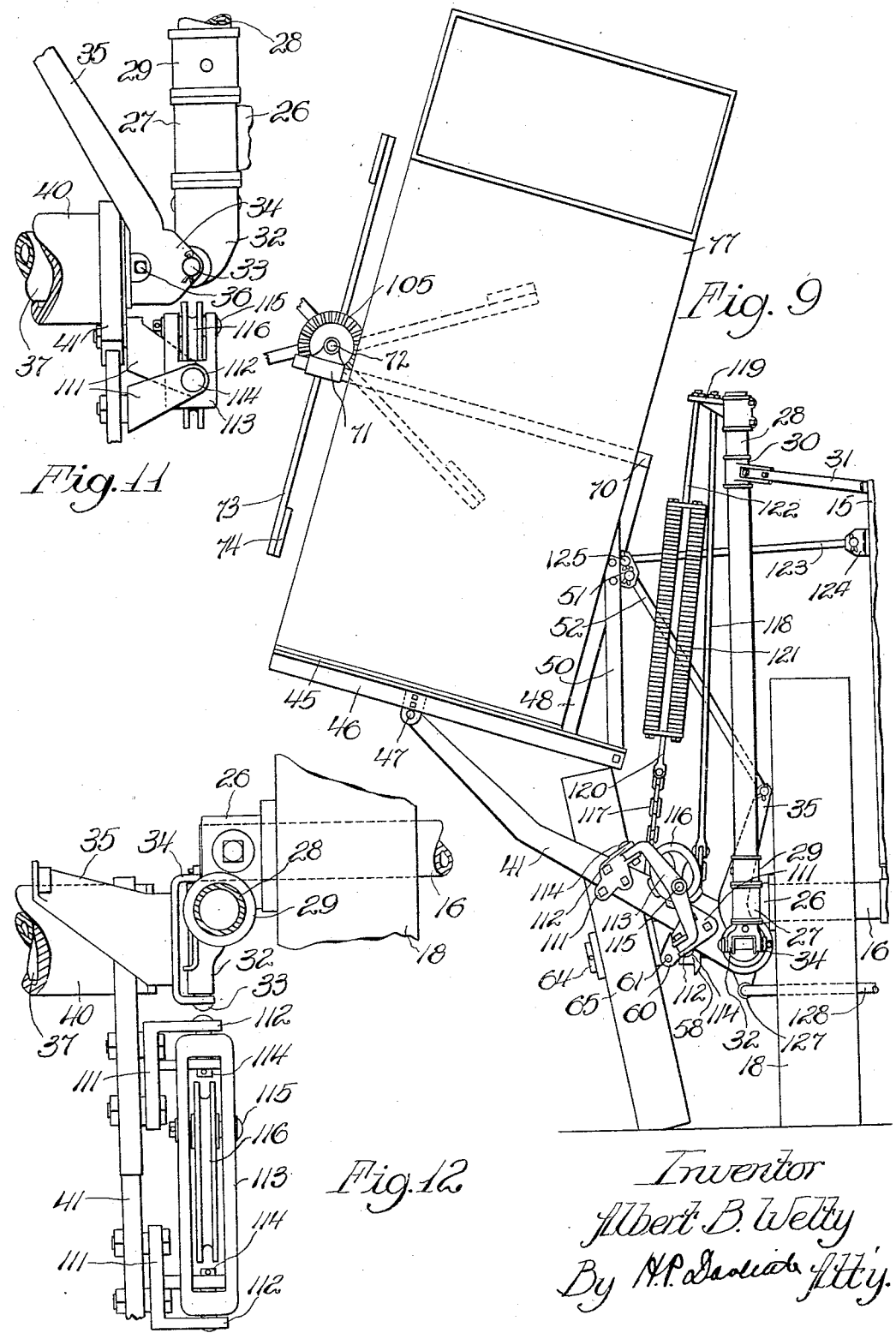

Patented Jan. 10, 1933

1,894,138

UNITED STATES PATENT OFFICE

ALBERT B. WELTY, OF KENILWORTH, ILLINOIS, ASSIGNOR TO INTERNATIONAL HARVESTER COMPANY, A CORPORATION OF NEW JERSEY

HARVESTER THRESHER

Application filed June 22, 1931. Serial No. 545,908.

The invention relates to an improved harvester thresher.

The main object of the invention is to provide a harvester thresher of the kind having a floating and folding platform, said harvester thresher to be relatively compact and light in weight without sacrificing width of cut or threshing capacity, whereby to facilitate handling in the field and to lessen the cost of manufacture.

Another object is to provide a unified, rigidly associated platform and elevator spout structure connected to a floating and folding harvester support.

Still further, it is an object to provide an improved counter-balance for such a platform sructure, which counter-balance need not be interfered with when the platform and harvester support are folded to transport position, and which counter-balance always maintains the same relative position to the platform and, therefore, is equally effective to support the platform structure in either its folded or unfolded position, and also during the folding movement of said platform.

It is also an object of the invention to provide a novel form of guide for the elevator spout to connect the same to the feeder house in advance of the thresher.

Other objects will be apparent to those skilled in this art as the disclosure is more fully made.

These important objects may be achieved by the illustrative embodiment of the machine shown in the drawings, in which case the machine employs a thresher part and a harvester part comprising a support floatingly and foldingly connected to the said thresher part. This support has connected to it the platform which includes as a rigid part thereof, an elevator spout, which inclines upwardly at an abrupt angle to elevate the cut grain into the feeder house in advance of the thresher part. This elevator spout has a novel form of sliding and shifting connection with said feeder house. The thresher part supports a turnable standard that carries a spring counter-balance having connection with the platform to support the same. The arrangement is such that, when the harvester support is folded, the counter-balance always maintains the same relative position to the platform. Such counter-balance need never be disturbed when folding the platform to its trailing, transport position. The outer or grainward end of this harvester support is carried in a wheel which is held to rotate in a vertical plane when the platform is in cutting position and which wheel may be freed to trail and caster in a plane tilted from the vertical when the platform is folded alongside the thresher part for transport through narrow places. So much will suffice in presenting a general idea of the improved harvester thresher.

In the drawings:

Figure 1 is a plan view of the machine with the extreme outer grainward end cut off;

Figure 2 is a general elevatonal view of the grainward side of the machine, as shown in Figure 1;

Figure 3 is a general plan view with a part of the thresher side cut off and showing in full lines the normal or cutting position of the platform, and, in dotted lines, the position assumed by said platform when folded backwardly alongside the thresher for transport;

Figure 4 is a rear elevational view, in detail, to show the position of the combination grain and transport caster wheel in the grain cutting position of the platform;

Figure 5 is a similar rear view of this combination wheel when it is in its trailing, castering position, after the platform has been folded;

Figure 6 is a rear elevational view of the stubbleward end of the rigidly joined platform and elevator spout structure;

Figure 7 is a top plan detail view of the elevator spout, showing its slidable and shiftable connection to the feeder house in advance of the thresher;

Figure 9 is a front elevational view of the structure shown in Figure 8;

Figure 11 is a front, elevational, detail view of a portion of the counter-balance mechanism; and, Figure 12 is a plan view of the structure, somewhat elaborated, shown in Figure 11.

Figure 8:
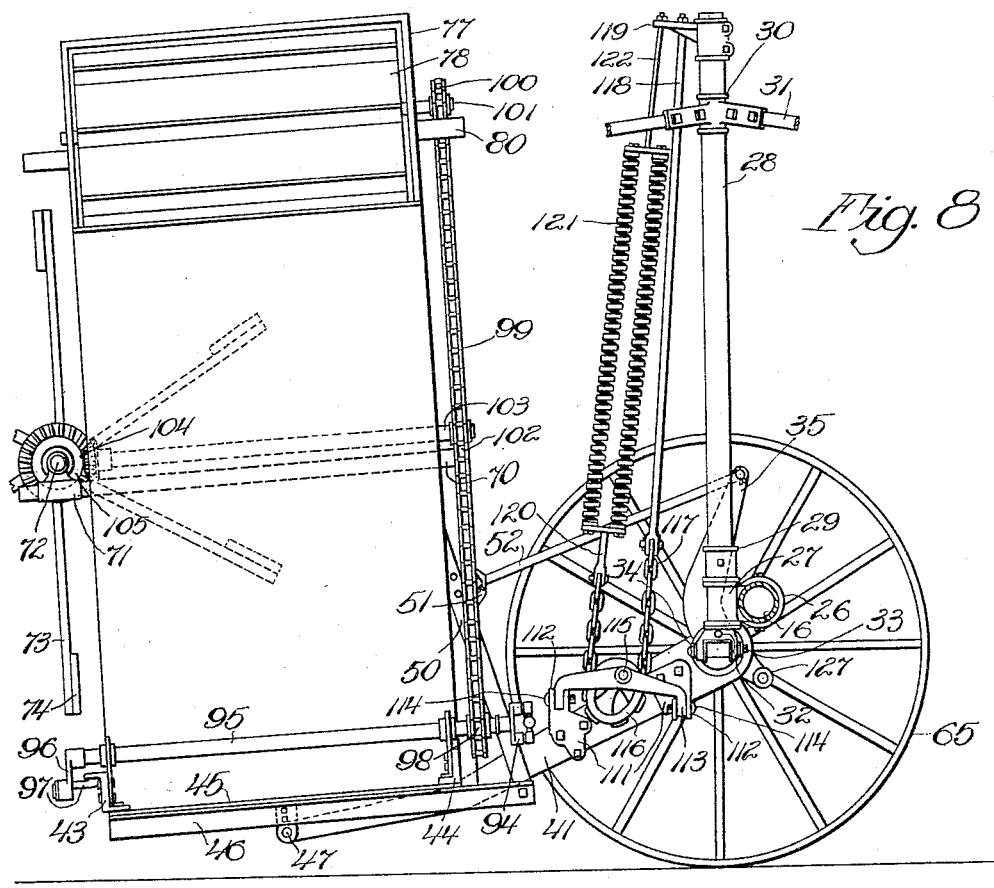
Figure 8 is a fragmentary side elevational view, as seen along the section line 8—8, when viewed in the direction of the arrows, shown in Figure 1, showing the improved counterbalance mechanism for the platform.

The improved harvester thresher embodies an elongated, substantially rectangularly shaped, thresher part or housing 15 suitably carried on a transverse, dead axle 16, which is carried in a pair of relatively large ground wheels 17 and 18. The forward end of said thresher housing serves as the feeder house which is open at its grainward side in a manner well known in this art, said thresher housing section of the thresher part being provided with a raised, flared, hood 19. The front and rear edges of the feeder opening are delineated by front and rear, vertically disposed, T-shaped, guide rails 20, as shown in Figure 7, the purpose of which will later appear. As shown in Figures 1 and 2, the thresher and feeder housings are supported on a main frame 21, which is projected longitudinally forward of the front rail 20 to provide a suitable support for a motor 22, said main frame at its extreme forward end being appropriately carried on the spindle 23 of a front wheel truck 24. Connected to the spindle 23 is a suitable draw connection 25 for the application of draft.

Figure 10:
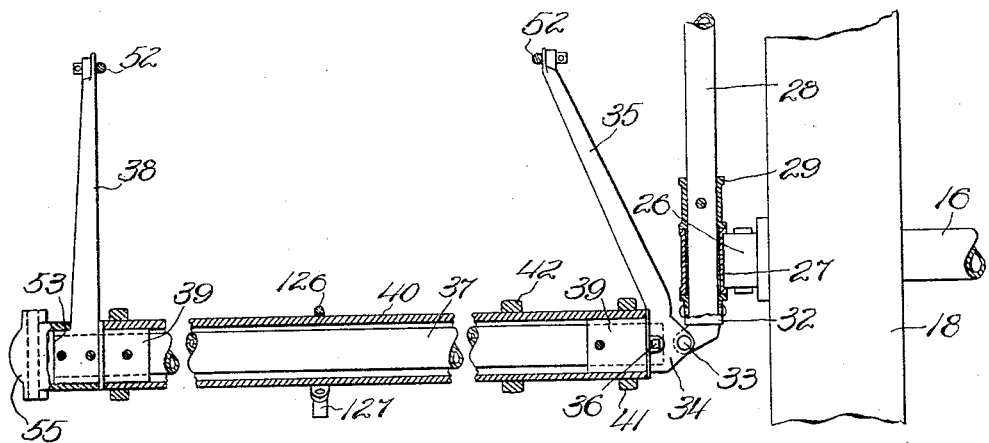
Figure 10 is a front view, in section, of the harvester support, as seen along the line 10—10 appearing in Figure 3, looking from front to rear.

As best appears in Figures 10, 11 and 12, the axle 16 projects laterally and grainwardly a short distance of the intermediate wheel 18. This projected end of the axle has fixed to it a sleeved bracket 26, which has integrally formed therewith a vertically disposed sleeve 27, that is disposed forwardly of the end of the axle and bracket.

Turnably mounted in this sleeve part 27, is a vertically disposed standard 28, which in practice may be a suitable section of pipe stock. Pinned to the lower end of this pipe standard is a sleeve 29, which serves as a stop to prevent the standard 28 from passing downwardly through the sleeve 27. As shown in Figures 1, 2 and 9, the upper end of this standard 28 is turnably mounted in sleeve bracket 30 appropriately carried by framework 31 extending rigidly from the grainward, upper side of the thresher housing 15. The lower end of the standard 28 projects somewhat below the bracket sleeve 27, where such end has pinned fast thereto a sleeve bracket 32. Said bracket 32 has its lower end turned outwardly slightly in a grainward direction to receive a hinge pin 33.

Looking now to Figure 10, it will be seen that a bracket 34, having an upwardly and grainwardy inclined arm 35, is connected to the pin 33 for up and down hinging movement. The grainward face of this latter bracket 33 is formed with a socket into which is fitted and made fast by a bolt 36, a dead or non-rotatable, transversely disposed axle pipe 37. At its other end, the axle has similarly made fast thereto an upwardly extending arm 38. Adjacent these arms 35, 38 the axle pipe 37 has riveted thereto, end bearing sleeves 39, and on these sleeves is rockably and concentrically carried a live or torque pipe 40. These pipe axle sections 37, 40 constitute the harvester platform support, which, because of the hinge pin 33, may float up and down, and, because of the connection to the turntable standard 28, may also be folded back alongside the thresher part. It is also to be noted that the harvester support is in forward offset relation to the thresher axle. Thus, this harvester support, it will now be seen, is of the floating and folding type.

Rigidly connected to the torque sleeve 40, to rock therewith, are end disposed, forwardly extending line bars 41 (see Figure 3), the inner or stubbleward one being appropriately strengthened by a diagonal brace 42. These line bars carry at their front ends the usual, transversely disposed, platform Z-bar 43 (see Figure 8), and spaced, in parallel, to the rear thereof, the line bars carry an angle bar 44. Fastened to the underside of these bars 43, 44 is the sheet metal platform 45 and, underneath the platform, are two cross braces 46, to which the forward ends of the line bars 41 are pivotally connected at 47, as is best shown in Figure 8. Secured to spaced points on the angle bar 44 are upright angle bars 48 which carry the usual backboard 49, generally indicated in Figure 6. The inner upright bar 48 is made secure by a suitable brace 50. The upper ends of these uprights 48 carry ears 51, to which are pivotally connected, rearwardly extending rods 52, each of which in turn is respectively pivotally connected with the upwardly extended arms 35, 38 heretofore described.

The outer or grainward end of the harvester support is carried in a combination grain and caster wheel structure, which will now be described in detail. Looking to Figures 3, 4 and 5, it will be seen that the lower portion of the arm 38 is formed as a sleeve 53 pinned to the dead axle 37.

This sleeve telescopically receives a sleeve 54 having an integral, forwardly extending arm 55, the forward end of which is turned slightly outwardly, as shown in Figure 3, to receive a vertical pivot pin 56. Connected with this pivot pin 56 is a rearwardly extending arm 57, the underside of said arm 57 being formed with a forked boss 58 to receive a latching bolt 59 that is pivotally connected to the underside of the sleeve 54. By this latch means then, the two arms 55, 57 can be locked side by side in parallel relationship, as shown in Figure 3. The arm 57 also is formed with a downturned ear 60 carrying a pin 61 for pivotally mounting a bracket 62 carrying two spaced pins 63 and an integrally formed spindle 64, which is mounted in the dual purpose wheel 65 that carries the outer end of the harvester support heretofore described. Further, the part 58 includes an upstanding ear 66 disposed over the arm 57, which is utilized in association with the pins 63 in the manner shown in Figure 4 to dispose the wheel vertically as when the platform is in the grain cutting position. When the wheel is unlatched to fold the support 37, 40, the ear 66 is disposed between the two pins, as shown in Figure 5, thereby tilting the spindle 64 downwardly about its pivot. This, of course, also tilts the wheel 65 at an angle to the vertical, it having been found that this wheel in such position functions better as a trailing caster wheel.

The sleeve 54 is formed at its back side with an eye 67 detachably to receive a diagonal brace bar 68, which at its other end is detachably connected in a socket member 69 appropriately carried by the thresher. The brace 68 functions in the usual way to hold the platform ahead in its cutting position, it being understood, when the platform and its harvester support are to be folded to transport position, that this brace 68 will first have to be removed.

Continuing with a description of the harvester side of the machine, it will be seen from Figures 1, 2, 8 and 9 that the uprights 48 serve as mounts for fore and aft arranged frame pieces 70, which at their front ends carry suitable brackets 71 for journaling the usual, transversely disposed reel shaft 72, which in turn carries the spiders 73 that mount the reel bats 74. The Z-bar 43 carries the usual reciprocatory cutting mechanism comprising the guard fingers 75 and knife 76.

As appears in Figures 3 and 6, the stubbleward end of the platform 45 has rigidly secured thereto an abruptly, upwardly and slightly stubblewardly inclined elevator spout frame 77, which receives spaced apart, endless apron conveyers comprising an upper conveyer 78 and a lower conveyer 79. Because the spout frame is rigidly mounted on the platform, these two parts maintain a fixed, angular relationship. The upper end of the spout frame carries a longitudinally disposed shaft 80 (see also Figure 7).

This shaft is fitted into guides 81 for fore and aft sliding movement, said guides in turn slidably embracing the vertical T-rails 20 heretofore described, to permit said elevator spout also to have free up and down sliding movement with respect to the feeder housing part in advance of the thresher housing 15. This elevator spout receives the cut material between its two conveyers to elevate the material and to discharge it into the feeder house through its open grainward side, as is well known in this art. The platform 45 also carries the usual rollers 82, shown in Figure 2, around which is trained the usual transversely disposed, endless, apron-type platform conveyer 83, which receives the cut material from the knife 76 and reel 74 to deliver the same in a stubbleward direction to the elevator spout conveyers 78, 79. The driving connections for the reel, conveyers, and knife of this harvester part will now be described.

The shaft of the motor 22, as appears in Figure 1, extends transversely in stubbleward direction, where it carries and drives a pulley 84. The pulley 84 drives a belt 85, which in turn rotates a second pulley 86. The pulley 86 drives a threshing cylinder shaft 87, which passes through the thresher housing 15 and projects from the grainward side thereof, where it carries a sprocket wheel 88 (see also Figure 2), that drives a downwardly extended chain 89 in turn driving a sprocket wheel 90 on a stub shaft 91 extending into a gear reducer case 92 appropriately carried by the frame 21 at the underside of the body 15. The gearing within the case 92 is not shown, but it will be understood that the same drives a forwardly extending, separable, telescopic shaft 93 transmitting power through a universal joint 94 to a longitudinal shaft 95 carried appropriately on the harvester platform framework. See Figure 8.

The forward end of the shaft 95 includes a crank 96 to reciprocate a pitman 97 connected in the usual way to reciprocate the knife 76 through the guards 75. As shown best in Figures 1, 6 and 8, the rear end of the shaft 95 drives a sprocket wheel 98, around which is trained, to be driven, an endless sprocket chain 99, which drives through a sprocket wheel 100, the upper roller shaft 101 to operate the lower apron conveyer 79 of the elevator spout. This same chain 99 then drives the relatively large sprocket wheel 102 that operates a longitudinal shaft 103 appropriately mounted as shown. The front end of shaft 103 drives a bevel pinion 104 in mesh with a bevel gear 105 on the reel shaft 72. In this fashion the harvester reel is driven. The chain 99 is continued to drive a sprocket wheel 106 on a roller shaft 109, which carries and drives per spout conveyer 78. Lastly, the chain 99 is trained around a sprocket wheel 108 on a roller shaft 109, which carries and drives the stubbleward platform roller 82 heretofore described, whereby to operate the platform conveyer 83 in the usual manner.

The platform 45 must, of course, be adjusted up and down in operation of the harvester thresher, to vary the height of cut in accordance with tall or short grain conditions. Such adjustment may be conventionally made by means of a vertical adjusting rod 110 connected to a line bar 41, as shown in Figures 1 and 2. A suitable operator's platform, not shown, will be hung from the thresher body 15 on its grainward side over the intermediate wheel 18, and, adjacent such platform, will be suitable controls for actuating said bar or rod 110. This platform with its associated harvester parts obviously is quite heavy and awkward to adjust manually. It, therefore, becomes necessary to provide a counter-balance mechanism for the platform to offset its weight and make adjustment thereof relatively easy and convenient. Thus, the mechanism next to be described is provided.

Referring especially to Figures 8 and 9, it will be seen that the stubbleward side of the line bar 41 carries two spaced brackets 111, each including a fork 112 to which is pivotally connected the down-turned ends of yoke bar 113, through the medium of pins 114, which lie at all times in alignment with each other and always in a common vertical plane with the hinge pin 33 heretofore described. See Figures 11 and 12. The fact of the pins 33 and 114 occupying a common vertical plane plays an important part in folding the harvester support to its transport position, as will presently appear. As shown best in Figure 8, the bifurcated fork 112 on one bracket 111 extends up, while the other fork 112 on the other bracket extends down, thus compensating for the dip in the line bar 41 to maintain the yoke 113 in a substantially horizontal position normally.

As appears in Figure 12, this yoke 113 is in the form of a rectangular loop in which is carried a shaft 115 for eccentrically and rockingly mounted an oval-shaped pulley wheel compensator 116, around which is trained a flexible element, such as the chain 117. One free end of the chain 117 is connected to a substantially vertically disposed rod 118 anchored at its upper end in a bracket 119 fixedly carried at the upper end of the turnable standard 28 already described. The other end of the chain 117 is connected to a short rod 120 secured to a battery of appropriate, substantially vertically arranged, counter-balancing springs 121 hung by means of another short rod 122 from the same bracket 119. It is a well known fact that counter-balancing springs are objectionable because they stretch and increase their tension or shorten and lose tension as the platform changes elevation during adjustment and, as a result, these springs are not uniformly efficient in performing the counter-balancing function. Such objection to the use of springs is overcome by the eccentrically mounted, rockably oval-shaped member 116, which in effect acts as a lever to maintain the spring length and tension substantially uniform in any position that the platform may assume within its range of adjustable movement. Thus, the member 116 acts as an automatic spring tension compensator. The operation and use of the improved machine will next be described.

When cutting and threshing grain, the platform and its harvester support are in the normal transverse position shown in Figures 1, 2 and 3 with the brace 68 in position, the spout frame 77 slidably and shiftably connected to the T-rails 20, and the outer wheel 65 latched to the arm 55, so that the said wheel is held against castering and to turn in vertical planes. A tractor preferably pulls the outfit through the draw element 25. The motor 22 is started and, through the driving connections described, the thresher and harvester parts comprising reel, conveyers, and knife, are driven. And so the grain is cut and delivered by the platform conveyer 83 to the elevator spout and abruptly up between the spout conveyers 78, 79 from the upper ends of which the cut material is discharged laterally into the feeder housing in advance of the thresher 15 through its open side. During the cutting operation, the harvester support may float up and down because of the hinge pin 33 provided for connecting the harvester support to the thresher part. Due to such floating movement and because the spout frame 77 is rigid relative to the platform, it must be necessary to slide the spout frame 77 up and down on the T-rails 20 in the manner already made known. Further, a fore and aft play for the spout frame 77 is permitted by the shafts 80 slidably carried in the guide brackets 81. If it becomes necessary to alter the height of cut, the platform is adjusted up or down through the medium of the element 110. The springs 121 serve to counter-balance the weight of the platform to make such adjustment easy, and the compensator 116 is effective to maintain the pull of the springs substantially uniform at all times. Such up and down movement of the platform results from the connection of the line bars 41 to the rockable torque sleeve 40, which turns on the dead axle support 37. After the particular field has been harvested, it may become necessary to transport the harvester thresher to another field. Because of the fact that during such transport the machine may have to pass through narrow places, it is desirable materially to reduce its overall width by folding the harvester support 37, 40 to a position alongside the thresher. Such alteration of the machine for transport will next be described.

First of all, the spout frame 77 must be raised high enough to run the slide brackets 81 off the T-rail tracks 20. This disconnects the spout from the feeder housing part of the thresher body. Next, the wheel 57 is unlatched from the arm 55 whereby to free the wheel for castering movement. Further, by the means 63, 66 and hinge 61, the wheel is tilted out of its vertical position. Lastly, the platform 45 will be raised to its maximum up position by the means 110, and the brace 68 will be disconnected.

The operator then pushes rearwardly on the outer, grainward end of the platform, causing the same and its harvester support 37, 40 to fold back horizontally through an angular distance of ninety degrees. This is made possible because the standard 28 is turnably mounted. Consequently, all of the counter-balancing mechanism also turns with the standard and, due to the maintenance of the pivot centers 33, 114 in common vertical planes at all times, the effectiveness of the counter-balance spring 121 is never destroyed, nor need it be disconnected when folding the platform. With the platform so swung back, the harvester is materially reduced in width to clear narrow places. As this folding movement is initiated, the separable telescopic drive shaft 93 separates the harvester part from the driving mechanism. Obviously, of course, the bar 110 will also have to be disconnected from the line bar 41 before folding.

After the harvester supports are thus folded back, as shown in Figure 8, an additional traveling clearance can be obtained by pushing the platform up to an elevated position, as shown in Figures 3 and 9, where the platform will be higher than its maximum up position in the cutting range. The springs 121 are effective to assist in raising the platform to this additional traveling clearance position. Positive means, however, is provided to keep the platform definitely in such elevated position. This means comprises a rod 123 hingedly carried by a bracket 124 on the thresher body, the other end of said rod having a hooked end 125 to fit in a hole in the bracket 51 carried by the platform frame member 50. A middle portion of the torque pipe support 40 carries a fixed ring 126 including at the underside of the pipe an eye 127. The thresher body 15 pivotally carries another hooked brace rod 128 which fits this eye 127, whereby to hold the harvester support 37, 40 in its folded position, as shown in Figure 3, in the dotted lines. The support may still float in this folded position.

From this detailed description, it will now be clear that structure has been provided which achieves all of the desirable objects heretofore recited.

It is the intention to cover herein all changes and modifications of the form of structure herein particularly shown which do not materially depart from the spirit and scope of the invention set forth in the following claims.

What is claimed is:

1. In a harvester thresher, a longitudinally disposed thresher part, a vertically disposed standard carried by the thresher part, a harvester support hingedly connected to the lower part of said standard for up and down movement, a harvester part connected to said support, and a counter-balance connected between the upper part of the standard and said harvester part.

2. In a harvester thresher, a longitudinally disposed thresher part, a vertically disposed turnably mounted standard carried by the thresher part, a harvester support hingedly connected to the lower part of said standard for floating movement, a harvester part connected to said support, and a spring counter-balance connected between the standard and harvester part.

3. In a harvester thresher, a transversely disposed axle, a thresher part carried on the axle, a bracket carried on the grainward end of said axle, a vertically disposed standard carried by the bracket, a harvester support hingedly connected to the lower end of the standard for floating movement, and a harvester part connected to said support.

4. In a harvester thresher, a transversely disposed axle, a thresher part carried on the axle, a bracket carried on the grainward end of said axle, a vertically disposed standard carried by the bracket, a harvester support hingedly connected to the lower end of the standard for floating movement, a harvester part connected to said support, and means carried by the standard to counter-balance the harvester part.

5. In a harvester thresher, a transversely disposed axle, a thresher part carried on the axle, a bracket carried on the grainward end of the axle, said bracket including a vertical sleeve, a vertically disposed standard turnably carried in said sleeve, a harvester support hingedly connected to the lower end of the standard for floating movement, and a harvester part connected to the support.

6. In a harvester thresher, a transversely disposed axle, a thresher part carried on the axle, a bracket carried on the grainward end of the axle, said bracket including a vertical sleeve, a vertically disposed standard turnably carried in said sleeve, a harvester support hingedly connected to the lower end of the standard for floating movement, a harvester part connected to the support, and a substantially vertically disposed counter-balance spring connected between the upper end of the standard and the harvester part.

7. In a harvester thresher, a transversely disposed axle, a thresher part mounted on the axle, a bracket carried on the grainward end of the axle, said bracket having a forwardly extended sleeve, a turnable member in the sleeve, a harvester support normally disposed transversely and hingedly connected to the turnable member for floating movement, said forwardly extending sleeve disposing the harvester support ahead and offset relative to the axle, and a harvester part connected with the axle.

8. In a harvester thresher, a transversely disposed axle, a thresher part mounted on the axle, a harvester support disposed transversely, means hingedly and foldingly connecting the support to the axle forwardly and in offset relationship thereto, and a harvester part connected to the support.

9. In a harvester thresher, a thresher part, a vertical standard turnably mounted by the thresher part, a harvester support hingedly connected to the lower end of the standard for floating movement and to fold with the turnable standard, line bars connected to the support, a harvester platform pivotally mounted on the line bars, a yoke pivotally mounted on one of said line bars, a compensator rockingly mounted on the yoke, a flexible element trained around the compensator, a rod connected to one end of the flexible element, a bracket at the upper end of the standard in which the rod is anchored, a spring counter-balance connected to the other end of the flexible element, and means carrying the spring counter-balance from the bracket on the standard, the hinge for connecting the support to the standard and the pivots for the yoke always occupying a common vertical plane.

10. In a harvester thresher, a transversely disposed axle, a thresher part mounted on the axle, a bracket embodying a vertically disposed sleeve carried at the grainward end of the axle, a vertical standard turnably mounted in said sleeve, a harvester support hingedly connected to the lower end of the standard for floating movement and to fold with the turnable standard, line bars connected to the support, a harvester platform pivotally mounted on the line bars, a yoke pivotally mounted on one of said line bars, a compensator rockingly mounted on the yoke, a flexible element trained around the compensator, a rod connected to one end of the flexible element, a bracket at the upper end of the standard in which the rod is anchored, a spring counter-balance connected to the other end of the flexible element, and means carrying the spring counter-balance from the bracket on the standard, the hinge for connecting the support to the standard and the pivots for the yoke always occupying a common vertical plane.

11. In a harvester thresher, a transversely disposed axle, a thresher part mounted on the axle, a bracket embodying a vertically disposed sleeve carried at the grainward end of the axle, a vertical standard turnably mounted in said sleeve, a harvester support hingedly connected to the lower end of the standard for floating movement and to fold with the turnable standard, line bars connected to the support, a harvester platform mounted on the line bars, a bracket at the upper end of the standard in which the rod is anchored, and a spring counter-balance connected between a line bar and the bracket on the standard.

12. In a harvester thresher, a transversely disposed axle, a thresher part mounted on the axle, a bracket embodying a vertically disposed sleeve carried at the grainward end of the axle, a vertical standard turnably mounted in said sleeve, a harvester support hingedly connected to the lower end of the standard for floating movement and to fold with the turnable standard, line bars connected to the support, a harvester platform mounted on the line bars, a yoke pivotally mounted on one of said line bars, a compensator rockingly mounted on the yoke, flexible means trained around the compensator, means including a spring counter-balance connected between one end of the flexible element and the upper end of the standard, the hinge for connecting the support to the standard and the pivots for the yoke always occupying a common vertical plane.

13. In a harvester thresher, a thresher part, a vertical standard turnably mounted by the thresher part, a harvester support hingedly connected to the lower end of the standard for floating movement and to fold with the turnable standard, line bars connected to the support, a harvester platform mounted on the line bars, a yoke pivotally mounted on one of said line bars, a compensator rockingly mounted on the yoke, flexible means trained around the compensator, means including a spring counter-balance connected between one end of the flexible element and the upper end of the standard, the hinge for connecting the support to the standard and the pivots for the yoke always occupying a common vertical plane.

14. In a harvester thresher, a thresher part having a feeder opening, vertical guide rails at the sides of said opening, a harvester support hingedly connected to the thresher part for floating movement, a transverse platform supported by the support, a header spout frame carried by the stubbleward end of the platform, and means connecting the spout frame with said rails for vertical sliding movement and for fore and aft shifting movement relative thereto.

15. In a harvester thresher, a thresher part having a feeder opening, vertical guide T-rails at the sides of said opening, a harvester support hingedly connected to the thresher part for floating movement, a transverse platform supported by the support, a header spout frame carried by the stubbleward end of the platform, brackets slidingly embracing the T-rails, and means for connecting the spout frame to said brackets to have fore and aft shifting movement relative thereto.

16. In a harvester thresher, a thresher part having a feeder opening, vertical guide rails at the sides of said opening, a harvester support hingedly connected to the thresher part for floating movement, a transverse platform supported by the support, a header spout frame rigidly carried on the stubbleward end of the platform to have a fixed angle of inclination relative thereto, and means connecting the spout frame with said rails for guided vertical sliding movement and for fore and aft shifting movement relative thereto.

17. In a harvester thresher, a thresher part having a feeder opening, a harvester part connected to the thresher part and including a spout, and means connecting the discharge end of the spout to the thresher part for up and down movement in a substantially vertical line relative to the feeder opening.

18. In a harvester thresher, a thresher part having a feeder opening, a harvester part connected to the thresher part and including a spout, and means for connecting the spout to the thresher part in proximity to said feeder opening in a manner to cause the discharge end of said spout to move up and down in a substantially vertical path.

19. In a harvester thresher, a thresher part having a feeder opening at one side, a harvester part floatingly connected to the thresher part, said harvester part including a delivery spout delivering through said opening into the thresher part, and means for positively guiding the discharge end of the spout in an up and down direction relative to said opening.

20. In a harvester thresher, a thresher having a feeder opening at one side, guide means adjacent said opening, a harvester part floatingly connected to the thresher part, said harvester part including a delivery spout delivering through said opening into the thresher part, and means slidingly connecting the spout to the guide means for positively guiding the discharge end of the spout relative to said opening.

21. In a harvester thresher, a thresher having a feeder opening at one side, a guide rail adjacent said opening, a harvester part floatingly connected to the thresher part, said harvester part including a delivery spout delivering through said opening into the thresher part, and means on the spout slidingly connected to the rail for positively guiding the discharge end of the spout relative to said opening.

22. In a harvester thresher, a thresher having a feeder opening at one side, and mechanism connecting the spout to the thresher part for guiding the delivery end of the spout in its up and down movement adjacent the opening, said mechanism including means to enable the spout to shift slightly fore or aft.

23. In a harvester thresher, a thresher part including a feeder house having an opening at its grainward side, a roof for the feeder house, a harvester part floatingly connected to the thresher part, said harvester part including a spout delivering through the opening into the feeder house, means connecting the spout to the feeder house for up and down movement to guide the delivery end of the spout with respect to the opening, the roof of the feeder house along its grainward edge being set back to permit the discharge end of the spout to move to a point higher than the roof without interfering with the spout delivery into the house.

24. In a harvester thresher, a thresher part including a feeder house having an opening at its grainward side, a roof for the feeder house, a harvester part floatingly connected to the thresher part, said harvester part including a spout delivering through the opening into the feeder house, means connecting the spout to the feeder house for up and down movement to guide the delivery end of the spout with respect to the opening, the roof of the feeder house along its grainward edge including a cover portion to permit the discharge end of the spout to move to a point higher than the roof level without interfering with the spout delivery into the house.

In testimony whereof I affix my signature.

ALBERT B. WELTY.